(12) United States Patent
Satake

(10) Patent No.: US 11,341,798 B2
(45) Date of Patent: May 24, 2022

(54) DEVICE, METHOD, PROGRAM, AND STORAGE MEDIUM FOR PROVIDING RECOMMENDATION INFORMATION

(71) Applicant: Rakuten Group, Inc., Tokyo (JP)

(72) Inventor: Takashi Satake, Tokyo (JP)

(73) Assignee: Rakuten Groun. Inc., Tokyo (JP)

( * ) Notice: Subject to any disclaimer, the term of this patent is extended or adjusted under 35 U.S.C. 154(b) by 0 days.

(21) Appl. No.: 16/651,023

(22) PCT Filed: Sep. 27, 2017

(86) PCT No.: PCT/JP2017/034985
§ 371 (c)(1),
(2) Date: Mar. 26, 2020

(87) PCT Pub. No.: WO2019/064381
PCT Pub. Date: Apr. 4, 2019

(65) Prior Publication Data
US 2020/0258337 A1 Aug. 13, 2020

(51) Int. Cl.
*G07C 9/28* (2020.01)
*G06Q 30/02* (2012.01)
*G06Q 30/06* (2012.01)

(52) U.S. Cl.
CPC .......... *G07C 9/28* (2020.01); *G06Q 30/0201* (2013.01); *G06Q 30/0205* (2013.01); *G06Q 30/0631* (2013.01)

(58) Field of Classification Search
CPC .. G07C 9/28; G06Q 30/0201; G06Q 30/0205; G06Q 30/0631

USPC ....................................................... 705/7.29
See application file for complete search history.

(56) References Cited

U.S. PATENT DOCUMENTS

| | | | |
|---|---|---|---|
| 2004/0111454 A1* | 6/2004 | Sorensen | G06Q 30/0201 708/200 |
| 2008/0249858 A1* | 10/2008 | Angell | G06Q 30/0244 705/14.43 |
| 2009/0192903 A1* | 7/2009 | Weiss | G06Q 20/3224 705/17 |
| 2010/0063891 A1* | 3/2010 | Townsend | G06Q 30/0222 705/26.1 |
| 2012/0316953 A1* | 12/2012 | Ramchandani | G06Q 20/352 705/14.58 |
| 2013/0191213 A1* | 7/2013 | Beck | G06Q 30/0207 705/14.64 |

(Continued)

FOREIGN PATENT DOCUMENTS

| | | |
|---|---|---|
| JP | 2001-350798 A | 12/2001 |
| JP | 2006-39651 A | 2/2006 |

(Continued)

OTHER PUBLICATIONS

Frost & Sullivan: Digital Proximity Marketing: Short-Range Wireless Technologies Potential Says Frost & Sullivan. Anonymous. M2 Presswire [Coventry] Mar. 9, 2009.*

(Continued)

*Primary Examiner* — Timothy Padot
(74) *Attorney, Agent, or Firm* — Sughrue Mion, PLLC

(57) ABSTRACT

An information processing device detects that a user has exited a shop, and transmits recommendation information based on information of the shop to a user who is detected to have exited the shop.

12 Claims, 11 Drawing Sheets

(56) References Cited

U.S. PATENT DOCUMENTS

| | | | | |
|---|---|---|---|---|
| 2015/0324812 A1* | 11/2015 | Wang | ................ | G06Q 30/0201 |
| | | | | 455/456.1 |
| 2016/0302037 A1* | 10/2016 | Jack | ................... | G06Q 20/4015 |
| 2016/0358122 A1* | 12/2016 | Tiwary | ................ | G06Q 20/322 |
| 2017/0091812 A1* | 3/2017 | Wong | ................ | G06Q 30/0253 |

FOREIGN PATENT DOCUMENTS

| | | | |
|---|---|---|---|
| JP | 2010-252273 | A | 11/2010 |
| JP | 2013-219749 | A | 10/2013 |
| JP | 2014-192587 | A | 10/2014 |
| JP | 2015-014887 | A | 1/2015 |
| JP | 2015-149020 | A | 8/2015 |

OTHER PUBLICATIONS

Proximity marketing: NFC vs. Bluetooth and Wi-Fi. Romanov, Alex. Network World: NA. Network World, Inc. (Oct. 12, 2012).*
International Search Report for PCT/JP2017/034985 dated Nov. 7, 2017 [PCT/ISA/210].
Final Rejection dated Jun. 2, 2020, from the Japanese Patent Office in Application No. 2019-545452.
U.S. Appl. No. 16/651,011, filed Mar. 26, 2020, Satake.

* cited by examiner

FIG. 3

LOG DB 52

| HISTORY ID | DATE AND TIME INFORMATION | USER ID | ACTION TYPE | TARGET SHOP |
|---|---|---|---|---|
| ⋮ | ⋮ | ⋮ | ⋮ | ⋮ |
| 17052955123 | 2017/05/29 10:21:01 | U09921 | VISIT TO SHOP | SHOP200A |
| ⋮ | ⋮ | ⋮ | ⋮ | ⋮ |
| 17052955131 | 2017/05/29 10:29:44 | U09921 | EXIT FROM SHOP | SHOP200A |
| ⋮ | ⋮ | ⋮ | ⋮ | ⋮ |
| 17052955184 | 2017/05/29 10:55:38 | U09921 | VISIT TO SHOP | SHOP200B |
| ⋮ | ⋮ | ⋮ | ⋮ | ⋮ |
| 17052955259 | 2017/05/29 11:13:53 | U09921 | PURCHASE | SHOP200B |
| ⋮ | ⋮ | ⋮ | ⋮ | ⋮ |
| 17052955261 | 2017/05/29 11:14:19 | U09921 | EXIT FROM SHOP | SHOP200B |
| ⋮ | ⋮ | ⋮ | ⋮ | ⋮ |
| 17052958915 | 2017/05/29 19:15:27 | U00764 | VISIT TO SHOP | SHOP200A |
| ⋮ | ⋮ | ⋮ | ⋮ | ⋮ |
| 17052958992 | 2017/05/29 19:26:07 | U00764 | EXIT FROM SHOP | SHOP200A |
| ⋮ | ⋮ | ⋮ | ⋮ | ⋮ |

DEVICE, METHOD, PROGRAM, AND STORAGE MEDIUM FOR PROVIDING RECOMMENDATION INFORMATION

CROSS REFERENCE TO RELATED APPLICATIONS

This application is a National Stage of International Application No. PCT/JP2017/034985 filed Sep. 27, 2017.

TECHNICAL FIELD

The present invention relates to an information processing device, an information processing method, a program, and a storage medium, and specifically relates to a technique to transmit information to a user.

BACKGROUND ART

There has been known a technique that provides information considered beneficial for a user based on an action of the user on a network. For example, presenting a product page that might arouse an interest of a user corresponding to a browsing history of the user, selecting and presenting an advertisement corresponding to a purchase history of the user from various kinds of advertisements, and similar techniques are performed.

By applying these techniques, there is disclosed a technique that presents information considered beneficial based on an action of a user even in an actual shop (physical shop), not only the information presentation on the Internet.

For example, Patent Literature 1 discloses a technique that provides information to suggest a product purchase in a physical shop based on profile information and purchase history information of a user.

CITATION LIST

Patent Literature

Patent Literature 1: JP 2015-14887 A

SUMMARY OF INVENTION

Technical Problem

However, the technique disclosed in Patent Literature 1 transmits the recommendation information relating to the shop where the user has visited, but this does not necessarily mean that it is performed at an appropriate timing.

The present invention has been made in view of such a circumstance, and it is an objective of the present invention to provide beneficial information when it can be estimated that a user has failed to accomplish a purpose in a visited shop.

Solution to Problem

The information processing device according to the present invention includes a detecting unit, and a recommendation unit. The detecting unit detects that a user has exited a shop. The recommendation unit transmits recommendation information based on information of the shop to the user who is detected to have exited the shop.

This transmits the recommendation information after narrowing down a user as a transmission target of the recommendation information into the user who is detected to have exited the shop.

The above-described detecting unit of the information processing device may detect that a user has taken a purchase action in the shop.

A necessity and a selection of the recommendation information is performed corresponding to whether the user has taken the purchase action or not.

The above-described recommendation unit of the information processing device may transmit information relating to a shop from which an exit from the shop is detected as the recommendation information when a purchase action is not detected in the shop from which the exit from the shop is detected.

It is highly possible that the shop where the user has visited is a shop that matches the interest and the concern of the user. The recommendation information on such a shop is transmitted to the user.

The above-described recommendation unit of the information processing device may transmit information relating to a substitute shop as the recommendation information when a purchase action is not detected in the shop from which an exit from the shop is detected, the substitute shop being a shop different from the shop from which the exit from the shop is detected.

In the shop from which the purchase action is not detected despite the visit to the shop, it is highly possible that the user has failed to accomplish a purpose. The shop that serves as a substitute of such a shop is presented to the user.

The above-described recommendation unit of the information processing device does not necessarily transmit the recommendation information relating to the substitute shop when the substitute shop is unavailable.

Recommending an unavailable shop might be disadvantageous for the user who receives the notification.

When a plurality of the substitute shops are extracted, the above-described recommendation unit of the information processing device may transmit a shop from which many purchase actions are detected as the recommendation information.

The shop from which many purchase actions are detected is highly possible to be an appropriate shop for many users. Such a shop is recommended to the user from whom the purchase action is not detected as the substitute shop.

The above-described recommendation unit of the information processing device may transmit the recommendation information using information of time at which a user takes an action.

That is, the substitute shop as the recommendation information is transmitted by considering the time at which the user's visit to the shop is detected and the time at which the purchase action in the substitute shop by another user is detected.

The above-described recommendation unit of the information processing device may transmit the recommendation information using meteorological phenomenon information relating to a location of a user as a transmission target.

For example, when the substitute shop to be transmitted as the recommendation information is crowded and there is a possibility of a generation of a waiting time, a selection and a presentation of the substitute shop can be made considering, for example, whether the waiting time can be spent in an appropriate state or not.

The above-described detecting unit of the information processing device may detect an exit from a shop by a change from a state with a detection of a user being located within a predetermined area to a state without the detection.

This detects the exit from the shop using a method to detect the visit to the shop.

The above-described detecting unit of the information processing device may detect an exit from a shop by using a short-range wireless communication.

This eliminates a need for activating, for example, a GPS function on the information terminal carried by the user in order to detect the exit from the shop.

In an information processing method according to the present invention, an information processing device executes a detecting step of detecting that a user has exited a shop, and a recommendation step of transmitting recommendation information based on information of the shop to the user who is detected to have exited the shop.

This information processing method ensures providing beneficial information when it can be estimated that the user has failed to accomplish a purpose in a visited shop.

A program according to the present invention is a program that causes an information processing device to execute procedures corresponding to the above-described respective steps. A storage medium according to the present invention is one that stores the above-described program. These achieve the above-described processes of the information processing device.

Advantageous Effects of Invention

The present invention ensures providing beneficial information when it can be estimated that a user has failed to accomplish a purpose in a visited shop.

BRIEF DESCRIPTION OF DRAWINGS

FIG. 3 is a drawing illustrating an exemplary log DB.

DESCRIPTION OF EMBODIMENTS

The following describes embodiments in the following order.
<1. System Configuration>
<2. Each Process Example>
<2-1. First Embodiment>
<2-2. Second Embodiment>
<2-3. Another Example of Recommendation Information Extraction Process>
<2-4. Another Example of Recommendation Information Selection Process>
<2-5. Another Example 2 of Recommendation Information Extraction Process>
<3. Modification>
<4. Summary>
<5. Program and Storage Medium>

1. System Configuration

Figure 1:
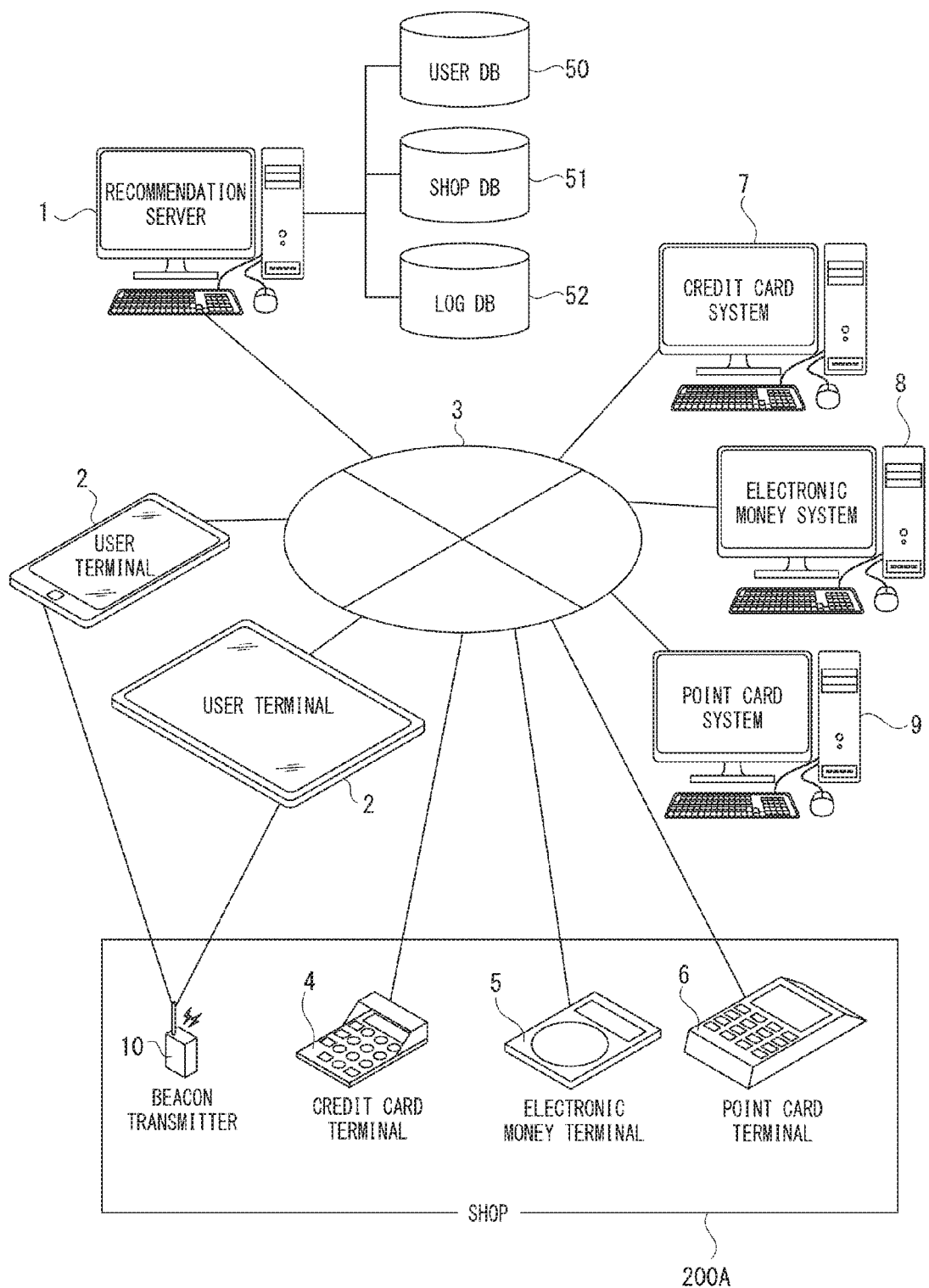
FIG. 1 is an explanatory drawing of a network including a recommendation server of an embodiment of the present invention.

FIG. 1 illustrates an exemplary configuration of a network system including a recommendation server 1 of an embodiment.

In the network system according to the embodiment, the recommendation server 1 for providing recommendation information to a user (member) is coupled to a user terminal 2 possessed by the user with a communication network 3. The recommendation information provided by the recommendation server 1 to the user is information relating to a shop 200. Specifically, information of products dealt in the shop 200, information of the shop 200 itself, and similar information.

FIG. 1 illustrates a shop 200A as an example of the shop 200. In the shop 200A, a credit card terminal 4, an electronic money terminal 5, and a point card terminal 6 are installed, and each of the terminals is coupled to the communication network 3.

A credit card system 7, an electronic money system 8, and a point card system 9 are coupled to the communication network 3 corresponding to the credit card terminal 4, the electronic money terminal 5, and the point card terminal 6, respectively.

The credit card terminal 4 is a terminal for confirming validity of a credit card used when a user purchases a product. Information of a credit card read by the credit card terminal 4 is transmitted to the credit card system 7 via the communication network 3. The credit card system 7 confirms the validity of the credit card, and transmits the result to the credit card terminal 4.

Besides, the credit card system 7 performs various kinds of processes, such as managing user information of the credit card, paying for a bill of a product to a shop, and filing a claim for a user with a usage fee.

The electronic money terminal 5 is a terminal for using an electronic money for purchasing a product, and makes a payment by reading information from a card to which an electronic money is added. The information read by the electronic money terminal 5 is transmitted to the electronic money system 8. The electronic money system 8 performs a subtraction process of an added amount corresponding to the usage of the electronic money, and performs a payment process to a shop.

Besides, the electronic money system 8 performs, for example, a management of information relating to a user and an electronic money card, and an addition process of an added amount based on adding of an electronic money.

The point card terminal 6 is a terminal for reading a point card used for, for example, adding points by purchasing a product and the like, and using points by purchasing a product, enjoying a privilege, and the like. Information of the point card read by the point card terminal 6 is transmitted to the point card system 9 via the communication network 3. The point card system 9 performs a subtraction process of the number of points corresponding to a usage of the points, and performs a process to pay for an amount of money corresponding to the used number of points to a shop.

Besides, the point card system 9 performs, for example, a management of user information of the point card, a management of the number of points, and a management of information of a shop where the point card is usable.

In the shop 200A, a short distance wireless communication transmitter is installed. As an exemplary short distance wireless communication transmitter, a beacon transmitter 10 is used in the following description.

The beacon transmitter 10 is installed to know an information processing terminal and the like located nearby, and, for example, transmits information at certain intervals (for example, at intervals of several hundred ms) with an internally mounted battery. The beacon transmitter 10 has a radio wave reaching distance of, for example, several m to several tens of m. Accordingly, at least a user's visit to the shop 200A is detectable.

Note that, in the case where the shop 200A has a large site, the beacon transmitter 10 with a long radio wave reaching distance may be installed or a plurality of the beacon transmitters 10, 10, . . . may be installed.

Note that, while FIG. 1 illustrates a state where one each of the credit card terminal 4, the electronic money terminal 5, and the point card terminal 6 is installed in the shop 200A, this is an example. A plurality of the credit card terminals 4, 4, . . . , a plurality of the electronic money terminals 5, 5, . . . , and a plurality of the point card terminals 6, 6, . . . , may be installed. It is not necessary that all the types of terminals are installed, and, for example, the credit card terminal 4 is not necessarily installed, the electronic money terminal 5 is not necessarily installed, or the point card terminal 6 is not necessarily installed.

Various examples are considered for a configuration of the communication network 3. For example, the internet, an intranet, an extranet, a Local Area Network (LAN), a Community Antenna TeleVision (CATV) communications network, a Virtual Private Network, a telephone network, a mobile communication network, and a satellite communications network, are considered.

Various examples are also considered for a transmission medium that constitutes all or a part of the communication network 3. For example, it is usable with wire, such as an Institute of Electrical and Electronics Engineers (IEEE) 1394, a Universal Serial Bus (USB), a power-line carrier, and a telephone line, with an infrared, such as an Infrared Data Association (IrDA), or without wire, such as a Bluetooth (registered trademark), 802.11 wireless, a mobile phone network, a satellite channel, and a terrestrial digital network.

The user terminal 2 can receive information (a beacon signal) transmitted from the beacon transmitter 10. The user terminal 2 has an installed software, and has a function to transmit the beacon signal received from the beacon transmitter 10 to the recommendation server 1 via the communication network 3.

The user terminal 2 is a portable, relatively small-sized information processing terminal, and, for example, a small-sized Personal Computer (PC) equipped with a communication function, a feature phone, a Personal Digital Assistant (PDA), or a smart device, such as a smart phone and a tablet terminal, are considered.

The user terminal 2 receives recommendation information from the recommendation server 1.

The recommendation server 1 is an information processing terminal, such as a PC, that receives location information from the user terminal 2 and transmits the recommendation information to the user terminal 2 as necessary.

Figure 2:
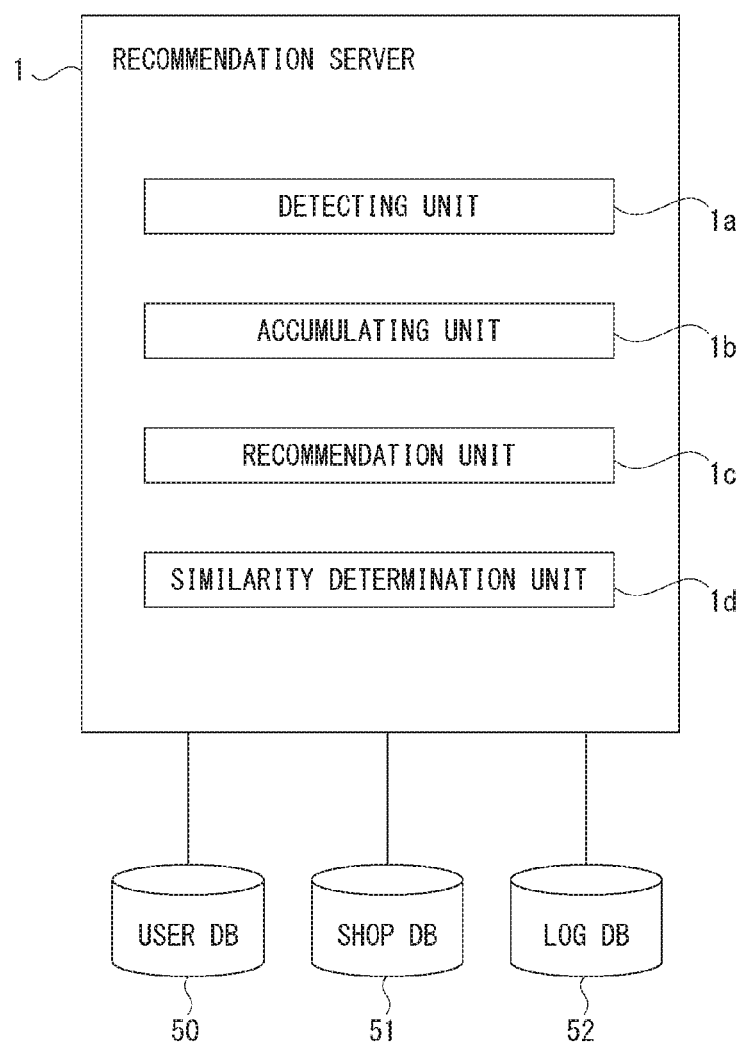
FIG. 2 is an explanatory drawing of a function composition of the recommendation server of the embodiment.

Therefore, the recommendation server 1 includes a detecting unit 1a, an accumulating unit 1b, a recommendation unit 1c, and a similarity determination unit 1d (see FIG. 2).

The detecting unit 1a detects that a user has approached a shop (has visited a shop), such as the shop 200A. The detection of the state of approaching the shop is performed by, for example, transmitting the beacon signal received by the user terminal 2 (or the fact that the beacon signal has been received) to the recommendation server 1.

Note that continuously detecting the approaching state ensures detecting a visit to and an exit from the shop. For example, the user's visit to the shop 200A is detected by a change from a state without a detection of an approached state to the shop 200A to a state with the detection. The user's exit from the shop 200A is detected by a change from the state with the detection of the approached state to the shop 200A to the state without the detection. That is, the detection of an exit from the shop is performed by detecting a state where the user is no longer located within a predetermined area from a state where the user is located within the predetermined area.

The beacon transmitter 10 is not necessarily used for the visit to and the exit from the shop 200A. For example, it is achievable by the user terminal 2 carried by the user periodically transmitting the location information by the Global Positioning System (GPS) to the recommendation server 1. The detecting unit 1a can know a positional relationship between the shop 200A and the user by comparing the received location information and location information of the shop 200A, and determine whether the user is visiting the shop 200A or not. Catching a change in the location information ensures knowing that the user has visited and has exited the shop 200A.

The detecting unit 1a detects that the user has taken an action of a product purchase and the like (purchase action) in the shop 200A. The detection of the purchase action is performed by obtaining purchase information from the credit card system 7, the electronic money system 8, and the point card system 9.

Note that the detection of the purchase action may be performed by the user himself/herself inputting the information. For example, the detection of the purchase action may be performed by obtaining a product review posted by the user and the like.

The location of the user terminal 2 in the shop 200A may be detected by installing the plurality of beacon transmitters 10, 10, . . . in the shop 200A and detecting signal strengths of the beacon signals that the user terminal 2 receives from the respective beacon transmitters 10, 10, . . . . In this case, it may be estimated that the purchase action has been performed when there is a trace that the user terminal 2 has been located in the proximity of a cash register. With this method, it is achievable with a simple process since it is not necessary to obtain information from the credit card system 7, the electronic money system 8, or the point card system 9 for detecting the purchase action. It is possible to transmit the recommendation information described later to the user who has exited the shop without moving to the proximity of the cash register as a user who surely has not performed the purchase action. That is, simple system configuration and process procedure ensure providing beneficial information for the user who has not performed the purchase action.

The accumulating unit 1b performs a process to accumulate action history information of a user. Specifically, the accumulating unit 1b detects the user's visit to the shop 200A and stores visit history information. The accumulating unit 1b detects the user's exit from the shop 200A and stores exit history information. The accumulating unit 1b detects the user's purchase action and stores purchase action history information.

The respective history information is managed by being associated with information of times when the actions are detected.

The recommendation unit 1c transmits the recommendation information to the user terminal 2. When the recommendation information is transmitted, processes are roughly divided into an extraction process of the recommendation information, a selection process of the recommendation information, a transmitting process, and the like are executed.

In the extraction process of recommendation information, the extraction process of recommendation information is performed in response to the fact that a user has visited the shop 200A and the fact that the user has exited the shop 200A are detected by the detecting unit 1a. That is, the extraction process of recommendation information extracts the recommendation information that should be transmitted to the user.

The selection process of recommendation information is a process to select information to be actually transmitted from the recommendation information extracted in the extraction process.

In the transmitting process, a process to transmit the selected recommendation information to the target user terminal 2 is performed.

Specific processes of the respective processes will be described later.

The similarity determination unit 1d performs a determination of a degree of similarity between users and a determination of whether they are similar or not. The determination of the degree of similarity or whether they are similar or not is determined, for example, based on user information for each user or based on shop information with a visit history of the user and shop information with a purchase action history of the user.

The recommendation server 1 can access a database in order to execute the above-described various processes. Note that the "database" is hereinafter written as a "DB (Database)." FIG. 1 and FIG. 2 exemplarily illustrate a user DB 50, a shop DB 51, and a log DB 52 as DBs which the recommendation server 1 can access The user DB 50 stores information relating to a user who receives the recommendation information provided by the recommendation server 1. For example, the user DB 50 stores personal information, such as login password, name, age, gender, yearly income, address, e-mail address, and hobby, associated with one user identification (ID) that can identify one user.

Furthermore, in the embodiment, present location information of the user may be stored. For the present location information, GPS information of the user terminal 2 may be received from the user terminal 2 or information of the beacon signal, which is received from the beacon transmitter 10 installed in the shop 200, may be received from the user terminal 2.

The shop DB 51 stores information of a physical shop, such as the shop 200. For example, the shop DB 51 stores shop name, location information, such as GPS information and address information, product IDs of merchandise or product category information (selling category information) that can identify a merchandise group, contact information, such as telephone number and e-mail address, and the like are associated with a shop ID that can uniquely identify each of shops.

The log DB 52 stores visit history information, exit history information, and purchase action history information of a user. These pieces of information are sequentially stored when the user visits a shop, exits the shop, and performs the purchase action. Specifically, as illustrated in FIG. 3, the respective records are stored along a time series. Each of the records, for example, has a configuration in which date and time information, user ID, action type, and information of target shop are associated with a history ID that can uniquely identify the record. The action type is to indicate whether the record relates to user's visit to the shop, exit from the shop, or purchase action.

Note that this configuration is merely an example, and information other than this may be included or a part of information is not necessarily included.

Note that FIG. 3 is an excerption of a part of various action histories of two users (U09921 and U00764) from the respective records stored in the log DB 52. That is, there is excerpted a part that indicates the history that, after visiting the shop 200A, a user A (U09921) has exited the shop without buying anything, and subsequently, after visiting a shop 200B, the user A has exited the shop with some purchased products, and that, after visiting the shop 200A, a user B (U00764) has exited the shop without buying anything.

The above-mentioned respective DBs (the user DB 50, the shop DB 51, and the log DB 52) may be achieved in any configurations as long as the recommendation server 1 can access the respective DBs. For example, all of the respective DBs may be formed in a storage unit in a system identical to the recommendation server 1 or a part or all of the respective DBs may be disposed in a computer system in a separate body, in a remote location, or the like. Obviously, it is not necessary that the respective DBs are formed within one device (for example, one HDD). It is also not necessary that each of the respective DBs is configured as one single DB. For example, the information stored as the log DB 52 may be stored and managed by a plurality of DBs (for example, a DB that stores history information on visits to and exits from the shop and a DB that stores history information on purchase actions). The above-mentioned respective DBs are merely an example that exemplarily illustrated the storage unit of information pertain to the processes in the embodiment having a configuration of one DB for each.

Figure 4:
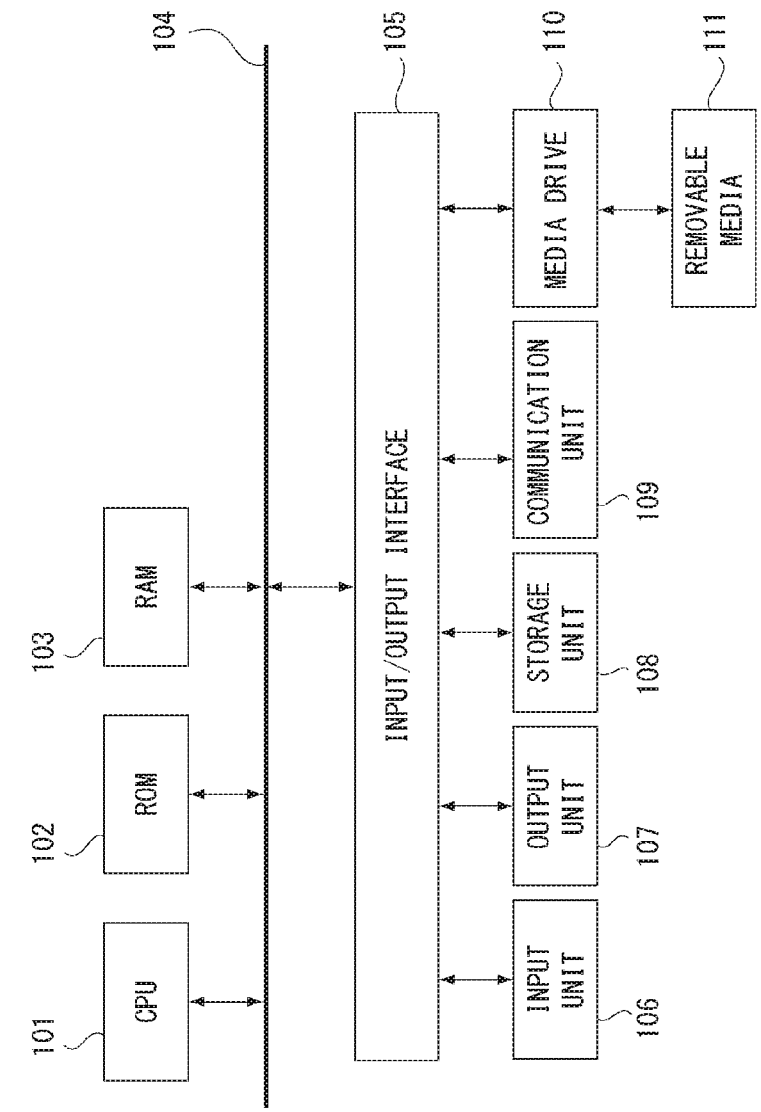
FIG. 4 is a block diagram of a computer device usable in the embodiment.

FIG. 4 illustrates a hardware configuration of an information processing device, such as a terminal that constitutes each of the systems, such as the recommendation server 1, the user terminal 2, the credit card system 7, the electronic money system 8, the point card system 9, and the like, illustrated in FIG. 1. The terminal that constitutes each of the systems, such as the recommendation server 1, the user terminal 2, the credit card system 7, the electronic money system 8, the point card system 9, is achieved by a computer device as illustrated in FIG. 4 that can perform information processing and an information communication.

In FIG. 4, a Central Processing Unit (CPU) 101 of the computer device executes various kinds of processes in accordance with a program stored in a Read Only Memory (ROM) 102 or a program loaded from the storage unit 108 into a Random Access Memory (RAM) 103. In the RAM 103, for example, data necessary for the CPU 101 to execute various kinds of processes is also stored as necessary.

The CPU 101, the ROM 102, and the RAM 103 are mutually coupled via a bus 104. This bus 104 is also coupled to an input/output interface 105.

The input/output interface 105 is coupled to an input unit 106, an output unit 107, a storage unit 108, and a communication unit 109.

The input unit 106 is configured of a keyboard, a computer mouse, a touchscreen, and the like.

The output unit 107 is configured of, for example, a display formed of, for example, a Liquid Crystal Display (LCD), a Cathode Ray Tube (CRT), and an organic Electroluminescence (EL) panel, and a speaker.

The storage unit 108 is configured of a Hard Disk Drive (HDD), a flash memory device, and the like.

The communication unit 109 performs a communication process and a communication between devices via the communication network 3.

The input/output interface 105 is coupled to a media drive 110 as necessary, and is appropriately mounted with a removable media 111, such as a magnetic disk, an optical disk, a magneto-optical disk, or a semiconductor memory, to perform writing and reading of information on and out of the removable media 111.

In such a computer device, data and a program are uploaded and downloaded by a communication by the communication unit 109. Delivery and receipt of the data and the program are possible via the removable media 111.

The CPU 101 performing process operations based on various kinds of programs executes information processing and a communication necessary for the terminal constituting each of the systems, such as the recommendation server 1, the user terminal 2, the credit card system 7, the electronic money system 8, and the point card system 9.

Note that, the information processing device that constitutes the terminal constituting each of the systems, such as the recommendation server 1, the user terminal 2, the credit card system 7, the electronic money system 8, and the point card system 9 is not limited to the computer device as in FIG. 4 configured alone, but a plurality of the computer devices may be systemized and thus configured. The plurality of computer devices may be systemized by a LAN and the like or may be disposed at remote locations by a VPN and the like using the internet and the like. A plurality of the information processing devices may include an information processing device as a server group (cloud) usable by a cloud computing service.

Each of the functions as the recommendation server 1 is a function achieved by a process executed corresponding to the program by the CPU 101 in the information processing device. However, all or a part of the processes of each of the configurations described below may be achieved by hardware.

When each of the functions is achieved by software, it is not necessary that each of the functions is achieved by respective, independent programs. One program may execute processes of a plurality of the functions, or one function may be achieved by a cooperation of a plurality of program modules.

Each of the functions may be dispersed in the plurality of information processing devices. Furthermore, one of the functions may be achieved by the plurality of information processing devices.

2. Each Process Example

A description will be given of the processes executed by the recommendation server 1 with reference to the attached drawings.

2-1. First Embodiment

In a first embodiment, a description will be given of an example where recommendation information is transmitted triggered by a user's visit to the shop 200 with reference to FIG. 5. In this example, when the user visits a certain shop, a shop that serves as a substitute is extracted based on an action that has been taken by another user, and the shop is provided as the recommendation information.

The recommendation server 1 determines whether action information is received or not in Step S101. The action information is information that a user has visited the predetermined shop 200, information that the user has exited the shop 200, and information relating to a purchase action taken in the shop 200. The recommendation server 1 stands by in Step S101 until such action information is received.

The recommendation server 1 that has received the action information performs a process to store the action information in the log DB 52 in subsequent Step S102. In view of this, one record is stored in the log DB 52.

The recommendation server 1 determines whether an action type of the stored action information relates to a visit to the shop or not in Step S103. In the case of ones other than the one relating to the visit to the shop, that is, one that relates to the exit from the shop and one that relates to the purchase action, the recommendation server 1 transitions to a standby state in Step S101.

On the other hand, in the case where the stored action information is the one relating to the visit to the shop, the recommendation server 1 proceeds to the process in Step S104. Note that, in each of the following embodiments and examples, a case where history information that the user B has visited the shop 200A is stored is described. That is, a case where processes in Step S104 and Step S105 are executed is described. Step S104 and Step S105 continue in response to the fact that a record with a history ID=17052958915 is stored in the log DB 52 illustrated in FIG. 3.

In Step S104, a process to extract recommendation information that should be presented to the user B is executed. Subsequently, the recommendation server 1 executes a selection process that selects a part of information from the extracted recommendation information in Step S105.

Exemplary extraction process and selection process of the recommendation information will be described with reference to FIG. 6 and FIG. 7.

Figure 6:
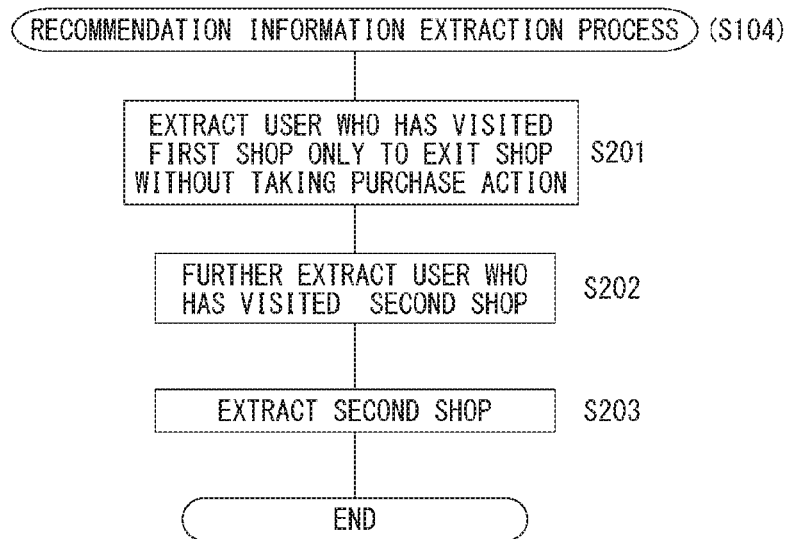
FIG. 6 is a flowchart of a recommendation information extraction process of the first embodiment.

In the recommendation information extraction process illustrated in FIG. 6, the recommendation server 1 extracts a user who has visited a first shop only to exit the shop without taking a purchase action in Step S201. The user extracted here may include the user B, but is basically another user other than the user B. The first shop is a shop where the user B as a transmission target of the recommendation information has visited, that is, the shop 200A. This is for transmitting information of a substitute shop that should be subsequently presented to the user B who has visited the shop 200A as the recommendation information.

Specifically, as illustrated in the log DB 52 in FIG. 3, one or a plurality of users (hereinafter, described as "first extracted users"), which include the user A who has visited the shop 200A only to exit the shop without taking the purchase action, are extracted.

Subsequently, the recommendation server 1 further extracts (selects) users who have visited a second shop in Step S202. Specifically, a process to further narrow down to users who have visited the second shop out of the first extracted users extracted in Step S201 is performed. The users further narrowed down in Step S202 are described as "second extracted users."

The second shop is another shop different from the first shop (that is, the shop 200A), and may be the shop 200B or may be a shop 200C.

Note that the users may be narrowed down to users who visits the second shop within a predetermined period, such as 30 minutes, from a time of an exit from the shop 200A as the first shop. This is because even though a user who visits the second shop after, for example, 24 hours from an exit from the first shop is extracted, it is difficult to determine that the user has visited the second shop instead of the first shop. That is, this is because the longer an elapsed time from an exit from the first shop to a visit to the second shop, the lower the possibility that the user has visited the second shop as the substitute shop of the first shop becomes.

Accordingly, narrowing down to the users who visit the second shop within the predetermined period, such as 30 minutes, one hour, or two hours from an exit from the first shop ensures increasing a possibility that appropriate recommendation information can be transmitted to the user B. Obviously, the predetermined period may be variable using location information of the first shop and the second shop. That is, when the first shop and the second shop are located in a close distance, the predetermined period may be set short, and when the first shop and the second shop are located in a long distance, the predetermined period may be set long. This ensures further increasing a possibility that an appropriate substitute shop can be presented to the user B in consideration of the location information of each shop.

Note that a visit to and an exit from another shop may be performed between an exit from the first shop and a visit to the second shop. Specifically, in the case where, after exiting the shop 200A, the user A visits the shop 200C only to exit the shop without taking the purchase action there either, but takes the purchase action in the shop 200B where the user A subsequently visits, it is highly possible that the substitute shop to be presented to the user B is the shop 200B where the purchase action is taken, not the shop 200C which is visited subsequently to the shop 200A. Further, in the case where the shop 200B is located next to the shop 200A, and the sold products are also similar, it is highly possible that the user B who exits the shop 200A subsequently visits the shop 200B unless the recommendation information is transmitted.

Even in such cases, with the configuration, the information of the shop where the purchase action has been taken is transmitted to the user B as the recommendation information, not the information of the shop which is visited before the purchase action is taken. Therefore, the user B can avoid unnecessary visit to a shop, thereby ensuring an effective use of time.

After extracting the second extracted user, the recommendation server 1 extracts one or a plurality of second shops in Step S203. Since the second extracted user is one or a plurality, the second shop extracted here is also one or a plurality. The extracted second shop is described as a "extracted shop." Note that, for example, the second shop may be the same for three second extracted users, and therefore, the extracted shops are not necessarily three shops.

The recommendation server 1 that has extracted the shop terminates the recommendation information extraction process illustrated in FIG. 6, and subsequently executes the recommendation information selection process (Step S105 in FIG. 5) illustrated in FIG. 7.

In the recommendation information selection process, the recommendation server 1 makes a selection by product category in Step S301. The recommendation server 1 selects, from one or a plurality of extracted shops, only shops having product category information that at least partly overlaps with that of the shop 200A as the first shop.

This is because the shop without overlapped product category information with that of the first shop has a low possibility to be the substitute shop of the first shop.

Subsequently, the recommendation server 1 makes a selection using information of time in Step S302. Specifically, a description will be given of a case where the shop 200A is an eating place as an example.

For example, assume that a user C exits the shop 200A without purchasing (drinking or eating) anything, and immediately after the exit, visits the shop 200C and takes the purchase action (a drinking and eating action). Assume that the user C takes the purchase action in the shop 200C at approximately 12 o'clock, and this can be construed as a lunch in terms of time.

On the other hand, the time when the user B visited the shop 200A was 7p.m. as illustrated in FIG. 3, and therefore, it is less likely to be a lunch in terms of time. Accordingly, presenting the shop 200C as the substitute shop to the user B based on the action history of the user C could be inappropriate.

In Step S302, a process to further narrow down using the information of time from the shops selected as substitute shop candidates is thus performed. Accordingly, the shop 200C is removed from the substitute shop candidates.

Next, the recommendation server 1 makes a selection by availability of the shops in Step S303. Each of the shops 200, 200, . . . is unavailable in some cases. For example, a shop on a shop holiday, a shop outside of business hours, a closed shop, and the like. A shop that is difficult to use because of a crowded situation may also be removed as an unavailable shop. Since it is unfavorable to present such shops 200 to the user as the substitute shop, the selection process in Step S303 removes them.

Information on shop holidays, opening hours, and the like is, for example, stored in the shop DB 51.

Note that only any one of the respective selection processes in Step S301 to Step S303 may be performed, or all the processes may be performed. When a presentation of the substitute shop to the user B is set to one shop, the subsequent selection processes is not necessarily performed at the point when the substitute shop becomes one. Besides, when it is allowed that there is no substitute shop to be presented to the user B, that is, there is no recommendation information, the subsequent processes may be terminated without being performed at the point when all the selection processes are performed and there is no longer any substitute shop.

Subsequently, the recommendation server 1 determines whether a further selection process is performed or not in Step S304. Specifically, it is determined whether there are more pieces of information left as the substitute shops than that of the recommendation information that is to be presented to the user B or not.

Figure 7:
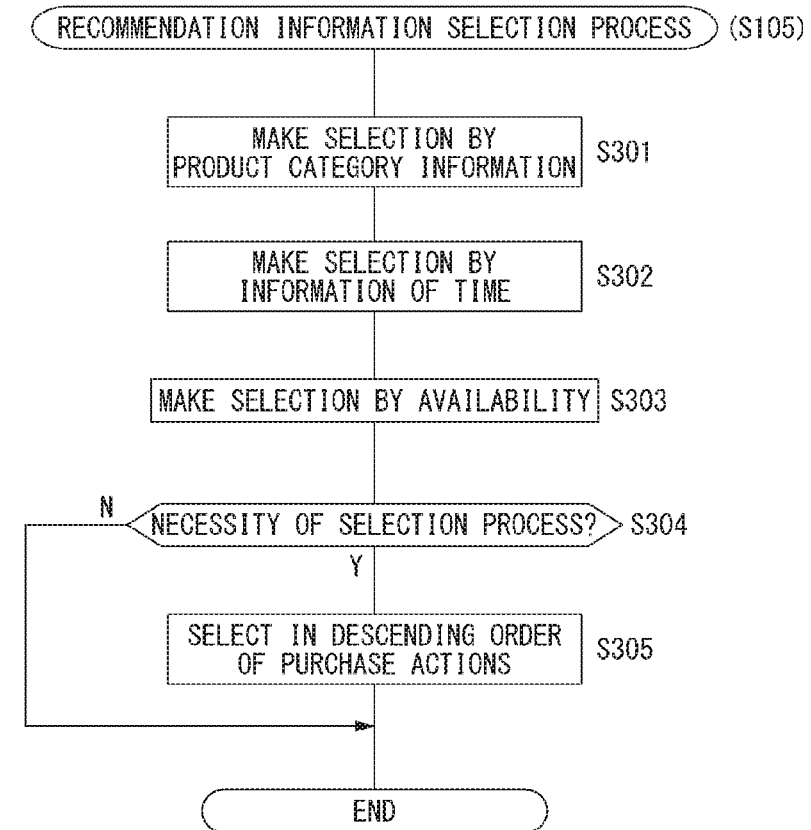
FIG. 7 is a flowchart of a recommendation information selection process of the first embodiment.

When no further selection process is performed, the recommendation information selection process illustrated in FIG. 7 is terminated without performing the process in Step S305. On the other hand, when the further selection process is performed, the process proceeds to a process in Step S305.

In Step S305, the recommendation server 1 performs a process to further narrow down the substitute shop candidates left as the result of the respective selection processes in Step S301 to Step S303. Specifically, the predetermined number of shops are selected in descending order of purchase actions. The predetermined number means the number of pieces of substitute shop information as the recommendation information to be presented to the user B. When one substitute shop is presented to the user, one substitute shop is selected in the descending order of purchase actions, and when three substitute shops are presented, three substitute shops are selected in the descending order of purchase actions.

Note that the shop with many purchase actions means the shop which many users have visited instead of the first shop (the shop 200A).

In Step S305, instead of selecting the shop with many purchase actions, the selection may be made based on other information. For example, it may be in order of shop close from a current location of the user B, or a shop without a visit history of the user B may be selected.

Figure 5:
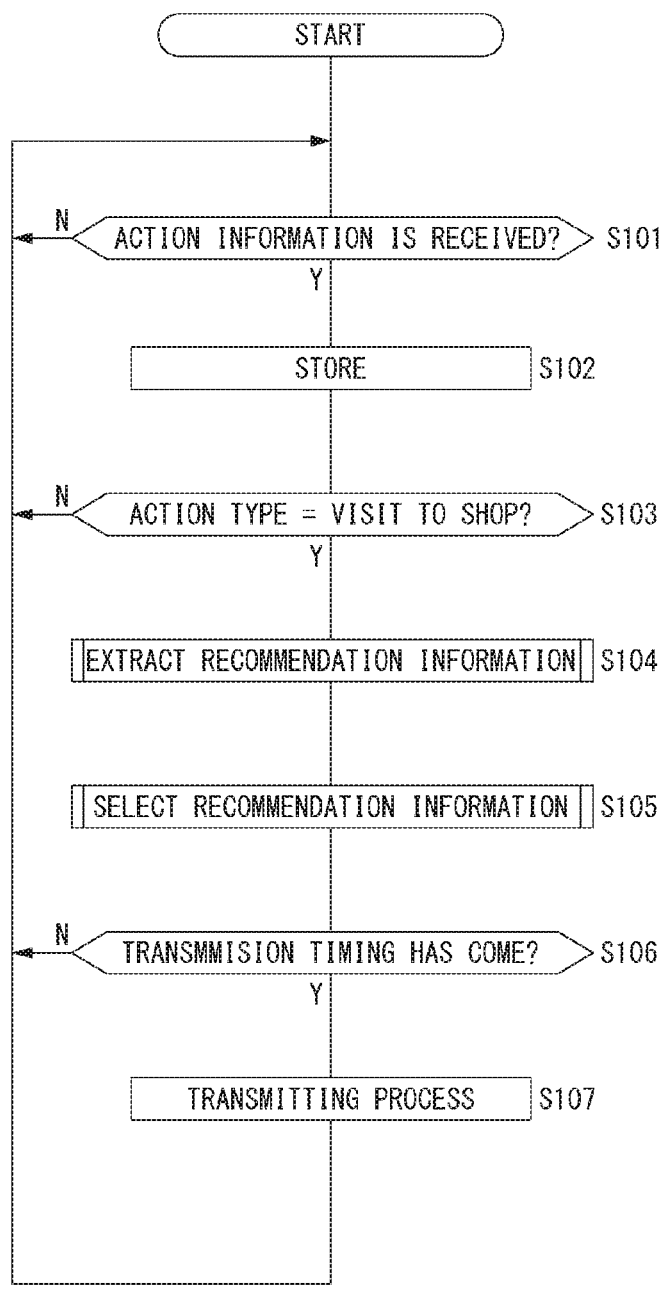
FIG. 5 is a flowchart relating to a first embodiment.

Now, the description returns to FIG. 5. The recommendation server 1 that has performed the recommendation information extraction process in Step S104 and the recommendation information selection process in Step S105 executes a process to determine whether a transmission timing has come or not in Step S106. When the transmission timing has not come, the process in Step S106 is continuously executed. That is, the recommendation server 1 stands by in Step S106 until the transmission timing has come.

The transmission timing is when transmitting the recommendation information to the user is considered appropriate. For example, it is after detecting that the user B has exited the shop 200A. While in the embodiment, a detection of a visit to a shop, a detection of an exit from the shop, and a detection of a purchase action of a user are performed, even when only the detection of a visit to the shop is performed, the time estimated as the exit from the shop may be set as the transmission timing. For example, when an average duration of stay in the shop 200A where the user B has visited is one hour, one hour after the detection of user B's visit to the shop may be set as the transmission timing.

Performing such a process ensures transmitting the recommendation information to the user at an appropriate timing only by detecting users' visit to a shop. This ensures transmitting the recommendation information while achieving a reduced process load of the recommendation server 1 and a reduced consumption of a storage area of the log DB 52.

The recommendation server 1 that has determined that the transmission timing has come in Step S106 performs a transmitting process in Step S107. With this transmitting process, the substitute shop information as the recommendation information is transmitted to the user B as a transmission target.

Note that, when there is no substitute shop as the recommendation information as the result of making various selections in the recommendation information selection process in Step S105, the series of processes illustrated in FIG. 5 is terminated without performing the processes in Step S106 or Step S107. Similarly, when the information that should be recommended is not extracted in the recommendation information extraction process in Step S104, it is terminated without executing the processes in Step S106 or Step S107.

When the crowded situation of each shop is obtained in Step S303 in FIG. 7, the crowded situations may be transmitted together when the recommendation information is transmitted in the transmitting process in Step S107. This ensures the user determines whether to use the substitute shop or not upon considering the crowded situations. That is, beneficial information for the user can be provided.

2-2. Second Embodiment

In a second embodiment, the recommendation information is transmitted triggered by a user's exit from the shop 200. Specifically, a description will be given with reference to FIG. 8.

Note that a description will be given of a case where after visiting the shop 200A as the first shop, the user B has exited the shop without taking the purchase action.

The recommendation server 1 determines presence/absence of a reception of the action information in Step S121, and stores the received action information in the log DB 52 in Step S122. The processes in Step S121 and Step S122 are processes similar to the processes in Step S101 and Step S102 in FIG. 5, thereby omitting their detailed descriptions.

The recommendation server 1 determines whether the action type of the action history stored at the previous process relates to an exit from the shop or not in Step S123. When the action history of which action type is other than one relating to the exit from the shop is received, the recommendation server 1 executes the process in Step S121 again.

On the other hand, when the action history of which action type relates to the exit from the shop is received, the recommendation server 1 performs the recommendation information extraction process in Step S124, and executes the recommendation information selection process in Step S125.

Figure 9:
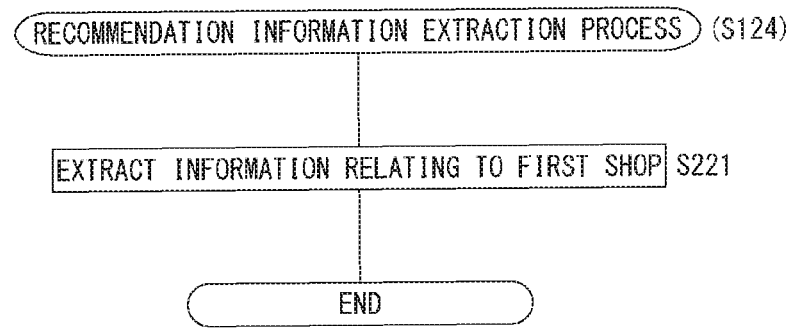
FIG. 9 is a flowchart of a recommendation information extraction process of the second embodiment
Figure 10:
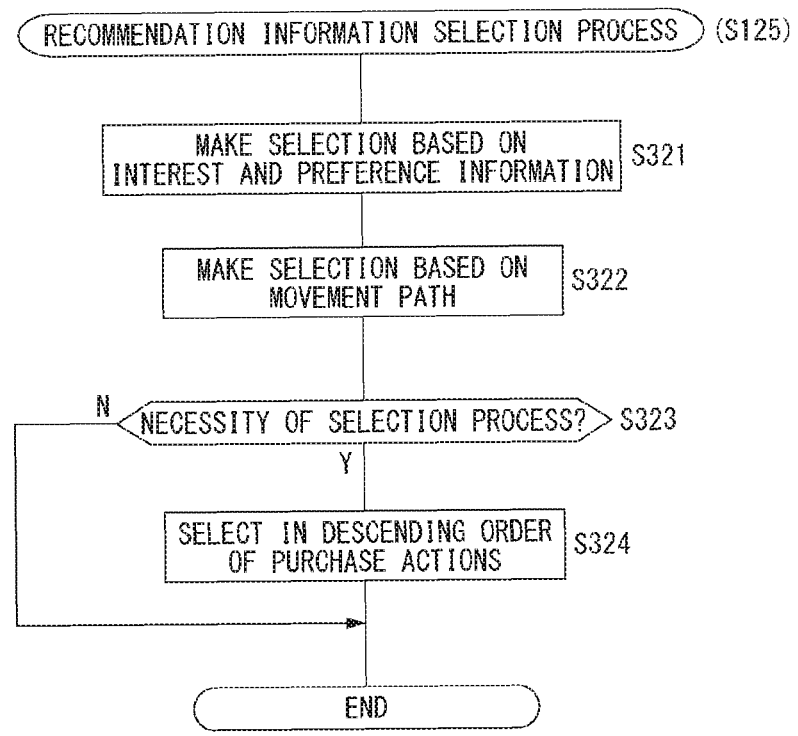
FIG. 10 is a flowchart of a recommendation information selection process of the second embodiment

With reference to FIG. 9 and FIG. 10, the recommendation information extraction process in Step S124 and the recommendation information selection process in Step S125 will be described.

In the embodiment, since the recommendation information is transmitted triggered by a user's exit from a shop, it can be considered to transmit information relating to a shop from which the user has just exited besides transmitting information on another shop different from the shop from which the user has exited.

Here, a description will be given of an example where the information relating to the shop from which the user has just exited is transmitted as the recommendation information.

The recommendation server 1 executes a process in Step S221 in FIG. 9 as the recommendation information extraction process. In Step S221, an extraction of recommendation information relating to the shop 200A from which the user B has exited is performed.

The information relating to the shop 200A is, for example, information on a product popular in the shop 200A, a product sharply increasing its sales, a product interested by the user B, or the like.

Subsequently, the recommendation server 1 performs respective processes in and after Step S321 in FIG. 10 to select the recommendation information from the extracted information.

First, in Step S321, a selection is made based on interest and preference information of the user. The interest and preference information of the user is, for example, stored in the user DB 50. These pieces of information may be information directly input by the user, may be estimated information extracted from the purchase action history of the user, or may be estimated information extracted from shop information where the user has visited.

Next, the recommendation server 1 executes a process to make a selection based on a movement path of the user in Step S322. For example, when the plurality of beacon transmitters 10, 10, . . . are installed in the shop 200A, the movement path of the user B in the shop 200A can be obtained. Using such information, it can be considered to obtain sections where the user has stopped by and sections where the user has not stopped by, to select product information relating to products sold in the sections where the user has not stopped by. Executing both the selection processes in Step S321 and Step S322 selects, as the recommendation information, an interesting product that the user B possibly failed to notice. Specifically, when the shop 200A is a book store, and works by authors whom the user B likes are temporarily moved to a special section or the like from ordinary positions, the user B possibly has exited the shop 200A without noticing them. Such a case is estimated by obtaining the movement path of the user B in the shop 200A to select appropriate recommendation information.

Note that positions of products in the shop may be, for example, stored in the shop DB 51. Moreover, without obtaining the positions where the respective products are placed, information that has accumulated information on users with what sort of attribution tend to come around each of sections may be used. The information is accumulated from movement paths and preference information of respective users.

The recommendation server 1 determines a necessity of a selection process in Step S323, and performs a further selection process in subsequent Step S324. Processes in Step S323 and Step S324 are similar to the processes in Step S304 and Step S305 described above, thereby omitting their detailed descriptions.

Figure 8:
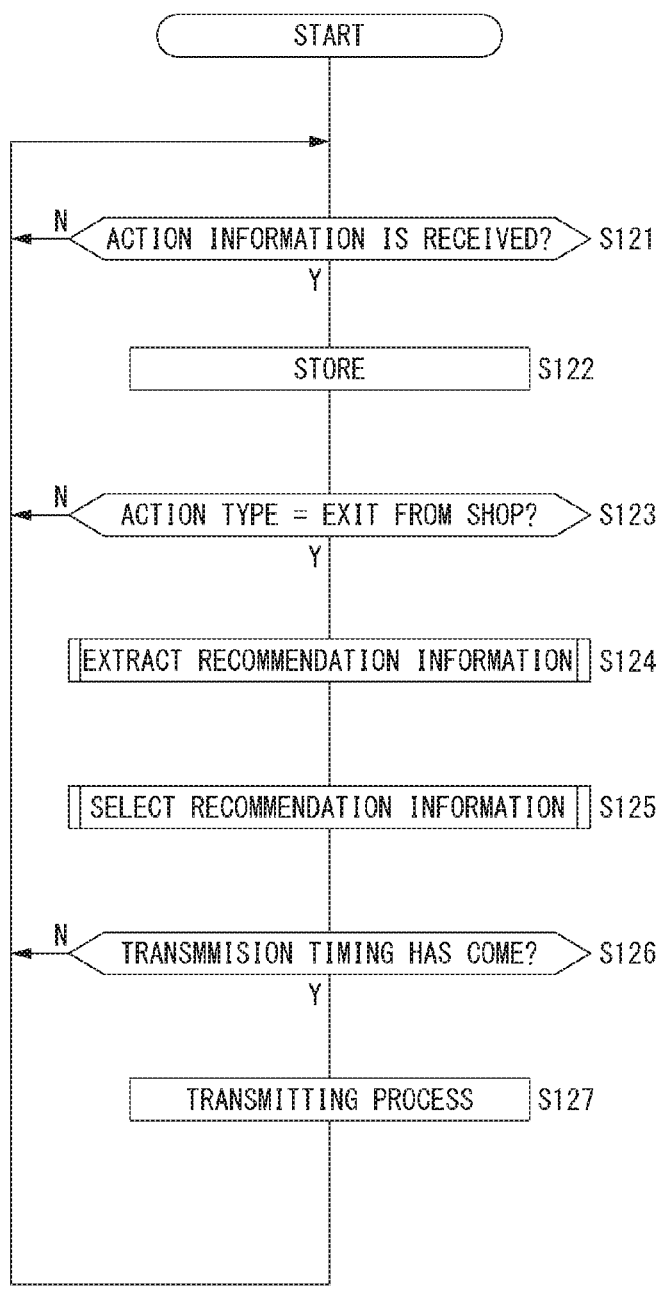
FIG. 8 is a flowchart relating to a second embodiment.

Now the description returns to FIG. 8. The recommendation server 1 that has extracted and selected the recommendation information executes the transmitting process in Step S126.

2-3. Another Example of Recommendation Information Extraction Process

Figure 11:
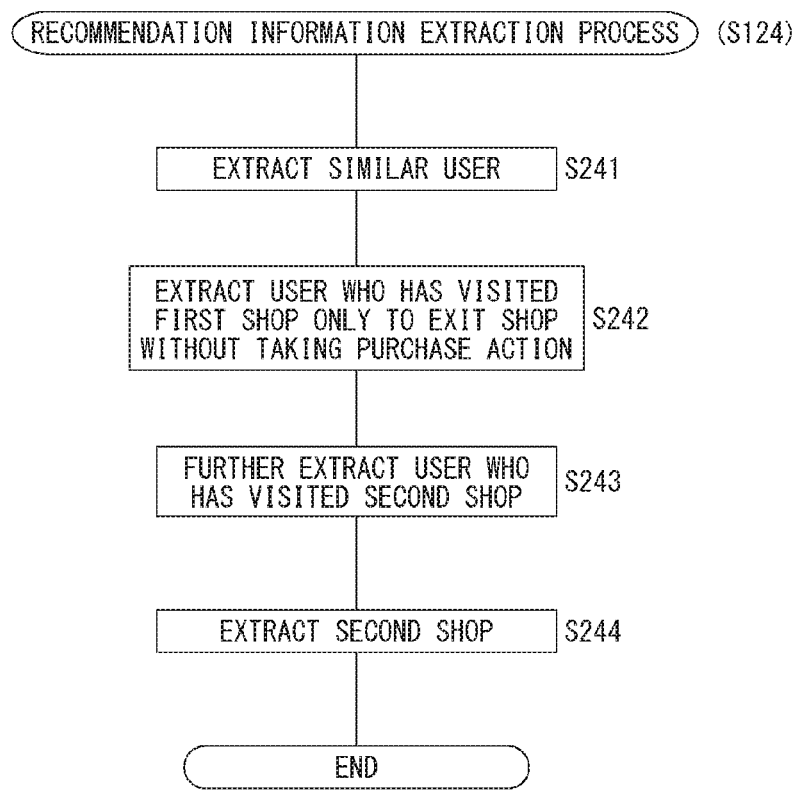
FIG. 11 is a flowchart of another example of a recommendation information extraction process.

Another example of the recommendation information extraction process in Step S124 in FIG. 8 will be described with reference to FIG. 11.

In the other example of the recommendation information extraction process, a description will be given of an example that, not simply extracting users who have visited the first shop only to exit the shop without taking the purchase action, and have visited the second shop and taken the purchase action, but extracting, among these users, a user who is similar to a user as a transmission target of the recommendation information.

First, the recommendation server 1 extracts a similar user in Step S241. The similar users are, for example, a user having a similar visit history, a user taking purchase actions in similar shops, a user having a similar family structure, a user having similar address information (user who lives close), and the like.

Subsequently, the recommendation server 1 performs a process to extract the first extracted user and the second extracted user among these similar users in Step S242 and Step S243. A process in Step S242 is a process similar to that of Step S201 in FIG. 6 described above, and a process in Step S243 is a process similar to that of Step S202 in FIG. 6 described above, thereby omitting their detailed descriptions.

At last, the recommendation server 1 extracts one or the plurality of second shops in Step S244. This process is a process similar to the process in Step S203 in FIG. 6.

Note that, while this process has been described as one example of the process in Step S124 in FIG. 8, this process may be executed as one example of the recommendation information extraction process in Step S104 in FIG. 5. That is, the processes in FIG. 11 may be performed as the recommendation information extraction process performed in response to the user B's visit to the shop 200A.

2-4. Another Example of Recommendation Information Selection Process

Another example of the recommendation information selection process in Step S125 in FIG. 8 will be described with reference to FIG. 12.

In the other example of the recommendation information selection process, a selection of the recommendation information is made considering atmospheric condition information.

Figure 12:
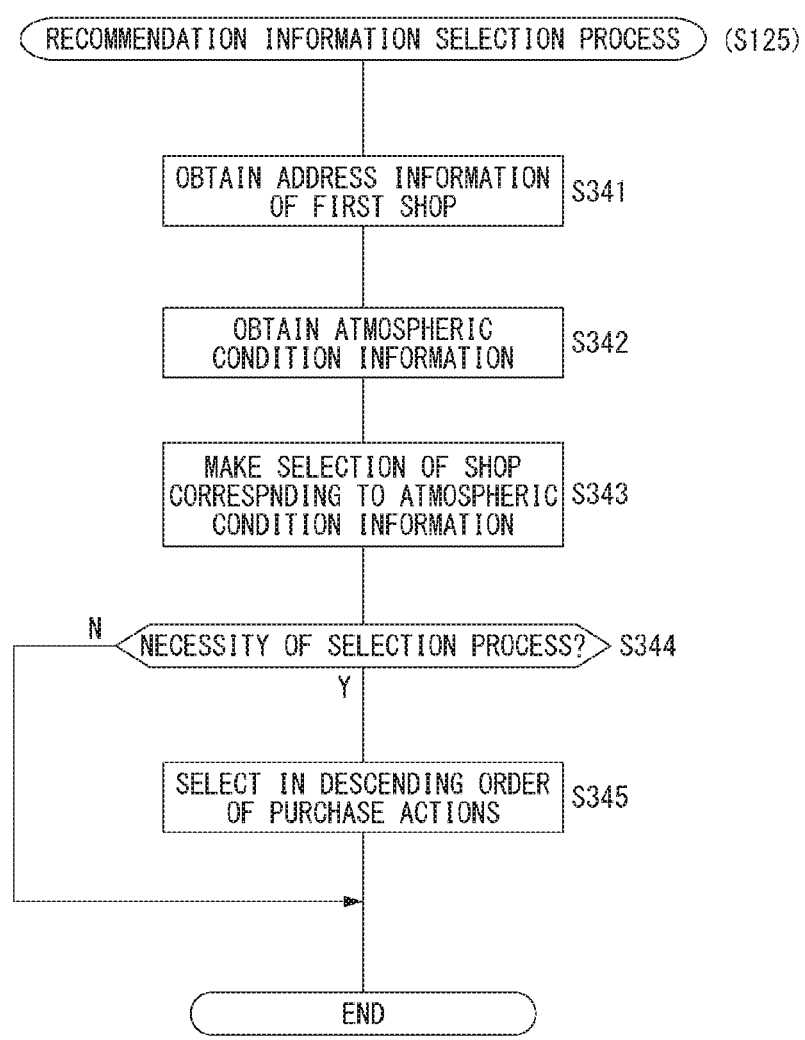
FIG. 12 is a flowchart of another example of a recommendation information selection process.

In this example, the recommendation information extraction process, such as Step S124 in FIG. 8, is executed triggered by the user B's exit from the shop 200A, and thereafter, a series of processes illustrated in FIG. 12 is executed.

In the recommendation information selection process using the atmospheric condition information, the recommendation server 1 obtains the address information of the shop 200A as the first shop from the shop DB 51 in Step S341.

Subsequently, the recommendation server 1 obtains current atmospheric condition information of the shop 200A in Step S342. The atmospheric condition information is obtained from a website and the like that deliver weather information via the communication network 3. The atmospheric condition information is, for example, temperature information, weather information, such as sunny or rainy, and wind speed information.

The recommendation server 1 makes a selection of a shop corresponding to the atmospheric condition information from one or a plurality of shops that are already extracted in Step S343. For example, when the weather information is rainy, a shop that can be reached moving through only an underground passage or an arcade with a roof without going through outdoor from the present location of the user B, that is, the shop 200A is preferentially selected. A shop that is located within the same building may be preferentially selected. At this time, the crowded situation of the shop may be further considered. For example, when it is known that the shop is crowded and the user will be made waiting, a shop having a waiting space with a roof may be selected.

When it is found that an external temperature is low and the shop is crowded, a shop in which indoor waiting is available may be selected. Besides, a shop may be selected based on pollen information or ultraviolet ray information. It is preferred whether to use these pieces of information or not is based on the user information of the user B. For example, whether the user is suffering from hay fever or not determines whether to perform a selection process using pollen information or not.

When the external temperature is low and the shop is crowded, but there is no wind, a shop where waiting under the sunlight is available may be selected.

Note that, when the temperature is mild and it is sunny, cloudy, or the like, a selection corresponding to the atmospheric condition information is not necessarily made. In such a case, for example, the recommendation information selection processes in FIG. 7, FIG. 10, and the like may be executed instead. Note that while the product information is selected in the previously mentioned example, the selection based on the interest and preference information in Step S321 in FIG. 10 here is a process to select the shop information. While in the selection process based on the movement path in Step S322, the example that makes a selection by estimating that the user has missed the information on the section where the user has not stopped by, here, the information on the section where the user has stopped by is obtained to estimate the product information for which the user is searching from the section that has been stopped by, and a selection of a shop is made based on the estimated information.

Subsequently, the recommendation server 1 determines a necessity of a further selection process in Step S344, and performs a process to select shops in descending order of purchase actions in Step S345. These processes are similar to the processes in Step S304 and Step S305 in FIG. 7, thereby omitting their detailed descriptions.

In order to perform the selection process based on the atmospheric condition information described in this example, the information relating to the atmospheric condition information may be stored in the shop DB 51. For example, the information whether a waiting area is appropriate or not when it is raining is stored for each shop. The information relating to the atmospheric condition information may be stored in the log DB 52. For example, a record regarding a visit to the shop may store the atmospheric condition of that time. When there are a little pieces of visit history information in a rainy weather and there are many pieces of the visit history information in a fine weather compared with those of other shops, it is highly possible that it is inappropriate as a shop to be presented as the recommendation information in the rainy weather. Therefore, it is considered that it is not selected in the recommendation information selection process.

2-5. Another Example 2 of Recommendation Information Extraction Process

In the recommendation information extraction process, as described above, for example, triggered by the user B's visit to the shop 200A or exit from the shop 200A, the recommendation information on the shop other than the shop 200A is presented to the user B based on the action histories other than that of the user B. At this time, when, for example, the user A visits the shop 200B and takes the purchase action after the shop 200A, the shop 200B becomes the candidate of the substitute shop to be presented to the user B.

In another example 2 of the recommendation information extraction process, how the user A has selected the shop 200B and visited the shop is considered. Specifically, it is considered whether the user A has selected the shop 200B based on a search operation or not.

Figure 13:
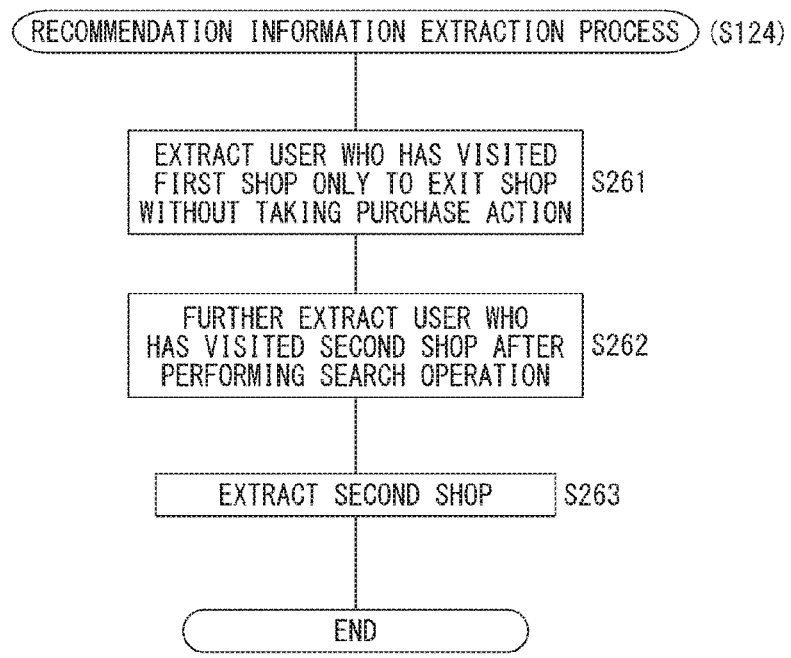
FIG. 13 is a flowchart of another example 2 of a recommendation information extraction process.

When the user A has obtained information relating to the shop 200B by performing a search operation after visiting the shop 200A only to exit the shop without taking the purchase action, it is considered that it is highly possible that the search operation for finding a substitute shop other than the shop 200A has been performed. It is highly possible that the shop 200B whose information is thus obtained is the substitute shop of the shop 200A for the user A. That is, it is highly possible that the shop 200B is the substitute shop of the shop 200A for the user B as well. A description will be given specifically with reference to FIG. 13.

The recommendation server 1 extracts users who have visited the shop 200A as the first shop only to exit the shop without taking purchase action in Step S261.

Subsequently, the recommendation server 1 narrows down the users to users who have visited the second shop obtained as the result of the search operation in Step S262. The presence/absence of the search operation is transmitted to the recommendation server 1 from the user terminal 2 and stored in the DB. For example, whether the search operation is associated or not is stored for the record relating to the visit to the shop among each record stored in the log DB 52.

The recommendation server 1 extracts the second shop in Step S263. This extracts the information on the second shop where the user has visited by performing the search operation after visiting the first shop.

Note that the recommendation information selection process executed by the recommendation server 1 thereafter may be the processes illustrated in FIG. 7, may be the processes illustrated in FIG. 10, or may be the processes illustrated in FIG. 12. At this time, the processes in Step S321 and Step S322 illustrated in FIG. 10 have a process content as described in the other example of the recommendation information selection process.

3. Modification

In the recommendation information selection processes illustrated in the above-described FIG. 7, FIG. 10, and FIG. 12, a predetermined number of pieces of information may be randomly selected from the information on each shop and the information relating to products extracted by the recommendation information extraction process previously executed. This allows preventing recommendation information from being biased, thereby ensuring providing various recommendation information.

In order to obtain the purchase actions of the users, a Point Of Sale (POS) system may be linked. This surely ensures obtaining the purchase actions.

The purchase action may include a request for back-order of a product, a purchase reservation, a shipping request, and the like. That is, not limited to the action to pay and to receive a purchased product in the shop 200, the purchase action includes the case where the product is received in the shop but the payment will be made at a later date, the case where the product will be shipped at a later date but the payment is made beforehand, and the like.

While each example described above has shown the example where the various kinds of processes are performed in a state of being logged in to a recommendation information providing service provided by the recommendation server 1 such that the log DB 52 stores the user ID information, the login is not necessarily needed. For example, the recommendation server 1 may issue a temporary ID valid for a few hours or a day to the user at the stage where a visit action to the shop 200, an exit action, and the purchase action are obtained.

The recommendation information provided by the recommendation server 1 is to transmit the recommendation information relating to the shop 200 from which the user has just exited and the recommendation information of the substitute shop of the shop 200 from which the user exited. Accordingly, even though the user A who exited the shop 200A takes the purchase action in the shop 200B after a week, it is highly possible that estimating the shop 200B as the substitute shop of the shop 200A is inappropriate. That is, it is not required to know whether each action taken over a week in the shop 200A and the shop 200B has been taken by an identical person or not.

Accordingly, since it is only necessary to know the visit action, the exit action, and the purchase action taken within a reasonably short period of time, such as a few hours, has been taken by an identical person, it is possible to sufficiently obtain the effect by knowing the actions of each user by the temporary IDs valid for a short period of time.

Combinations of each process described above are merely one aspect. Accordingly, whatever combinations of each process are made, various effects can be obtained. For example, as the recommendation information selection process, the respective selection processes in Steps S321 and S322 in FIG. 10 may be executed after the respective selection processes in Steps S301, S302, and S303 in FIG. 7. The recommendation information extraction process and the recommendation information selection process in the different examples may be combined.

Note that, while the example where the information on the physical shop is transmitted as the recommendation information has been described in each example described above, a virtual shopping mall or a virtual shop developed on the network may be presented as the substitute shop. Visiting the virtual shopping mall or the virtual shop can be regarded as the visit to the shop by starting to browse a web page of the shop developed on the network. An exit can be regarded by stopping browsing the web page. The substitute shop presented to the user in response to the exit from the shop may be another virtual shop belonging to the virtual shopping mall, or may be a physical shop not on the network.

Specifically, when the user A visits the physical shop 200A but does not take the purchase action, and subsequently visits the shop 200B and takes the purchase action, the recommendation server 1 accumulates a series of history information of it. Subsequently, when the user B who is a similar user similar to the user A visits (starts browsing the web page) a virtual shop 200A' of the shop 200A opened in a virtual shopping mall, and thereafter exits the shop (stops browsing the web page), the recommendation information on the shop 200B is transmitted to the user B. At this time, the recommendation information transmitted to the user B may be information relating to the physical shop 200B, or may be information relating to the virtual shop 2003 of the shop 200B. Obviously, both the information on the shop 200B and the shop 200B' may be transmitted.

4. Summary

As described in the above-described respective examples, the recommendation server 1 includes a proximity detecting unit (the detecting unit 1a) that detects that an information terminal (the user terminal 2) carried by a user has approached the shop 200, a purchase action detecting unit (the detecting unit 1a) that detects that a user has taken a purchase action in the shop 200, the accumulating unit 1b that accumulates history information relating to a visit to the shop 200 and the purchase action of a user, and the recommendation unit 1c that transmits recommendation information relating to a second shop to an information terminal of a user who is detected to have approached a first shop when a detection of visit history information to the first shop and a nondetection of purchase action history information in the first shop, and detections of visit history information and purchase action history information in the second shop are performed from history information of one user. The visit history information and the purchase action history information in the second shop have been accumulated after the history information relating to the first shop.

This provides, to the user, the information on the shop that serves as the substitute of the shop where the user has visited. The information is provided based on the visit history information and the purchase action history information of another user relating to the physical shop.

Accordingly, in the case of, for example, an eating place, when there is a second shop where the other user has dined instead of the first shop, the second shop is recommended as the substitute shop to the user who has failed to dine in the first shop.

Obviously, the first shop and the second shop are not limited to the eating place, and may be a shop that deals products, such as stationery. For example, when there is no writing material the user desires to purchase at the first shop, a stationery shop as a second shop that could be a substitute shop is recommended.

The second shop to be recommended to the user who is detected to be approaching the first shop is highly possible to be inappropriate when it is located in a place way too far from the location of the user. With this configuration, the shop in which another user who has actually visited the first shop has visited thereafter and taken the purchase action is recommended to the user as the substitute shop, thereby ensuring an increased possibility to be an appropriate recommendation to the user close to the first shop.

Furthermore, suppressed transmission and reception of unnecessary information achieves a reduced process load of the recommendation server 1 and a reduced process load of the user terminal 2 possessed by the user. Appropriate information being provided reduces a load of the user, such as making a search again, and suppresses a generation of a process load of the user terminal 2 in making a search.

As described in the other example (FIG. 11) of the recommendation information extraction process, the similarity determination unit 1d that determines a similarity between the users may be provided and the recommendation unit 1c may perform a transmission based on the history information of the similar user determined to be similar to the user as the transmission target.

This determines a degree of similarity between the user detected to be approaching the first shop and the user as an extraction origin of the recommendation information.

Accordingly, it is possible to increase a possibility that an appropriate substitute shop for the user as the transmission target (transmission destination) of the recommendation information is to be recommended as the second shop.

As described in the description of the detecting unit 1a, the proximity detecting unit (the detecting unit 1a) may detect the proximity to the shop 200 by using the short-range wireless communication (for example, a communication using a beacon signal).

This eliminates a need for activating, for example, the GPS function on the user terminal 2 carried by the user in order to detect the proximity to the shop 200.

The short-range wireless communication usually is communicative with a comparatively low power consumption. In particular, it consumes power lower than that when the GPS function is constantly activated. Accordingly, a battery consumption of the user terminal 2 carried by the user can be reduced, thereby ensuring achieving an improved convenience of the user.

As described in the second embodiment and the like, the recommendation unit 1c may transmit the recommendation information after detecting that the user as the transmission target has exited the first shop.

With this, the substitute shop is not presented as the recommendation information only by the user visiting the first shop.

Specifically, when the user has visited the first shop only to exit the shop without taking the purchase action, the second shop as the substitute shop is provided as the recommendation information. This ensures avoiding the transmission of the recommendation information to a user who is to take the purchase action in the first shop and does not need the recommendation of the substitute shop.

As described in the description of the detecting unit 1a, the detection of the purchase action may be performed based on the usage of the electronic money, the usage of the credit card, or the usage of the point card.

In the usage of the electronic money, the credit card, or the point card, the electronic data is handled in many cases, thereby ensuring an easy detection of the purchase action.

Accordingly, the detection of the purchase action can be surely performed together with the detection of a visit to a shop and the detection of an exit from the shop performed by using the GPS or the short-range wireless communication, thereby ensuring avoiding an unnecessary transmission of the recommendation information and the like.

As described in the first embodiment, the recommendation unit 1c does not necessarily transmit the recommendation information relating to the second shop when the second shop is unavailable.

Recommending an unavailable shop might be disadvantageous for a user who receives the notification.

Accordingly, not recommending such a second shop ensures achieving an improved convenience of the user.

As described in the first embodiment (FIG. 7), when the plurality of second shops are extracted from the history information of the plurality of users, the recommendation unit 1c may transmit, as the recommendation information, the shop having many pieces of purchase action history information of the plurality of users among the extracted second shops.

The next shop where the users without the detections of the purchase actions in the first shop have visited the most and taken the purchase actions is recommended to the user as the second shop.

Accordingly, the shop that fits the purpose of the user is recommended as the second shop, thereby ensuring an increased possibility that the beneficial information for the user can be provided.

As described in the first embodiment (FIG. 7), the accumulating unit 1b accumulates the history information associated with the information of time when the user has taken an action, and the recommendation unit 1c may transmit the recommendation information using the information of time.

That is, the recommendation information is transmitted considering the time when the user's visit to the first shop is detected and the time when another user takes the purchase action in the second shop where the other user visits subsequent to the first shop.

For example, it is considered that the second shop as the substitute shop that should be presented at a lunch time and the second shop as the substitute shop that should be presented at a dinner time are different. With this configuration, the second shop is extracted considering the information of time and transmitted as the recommendation information, thereby ensuring a further increased possibility of making an appropriate recommendation.

As described in the other example (FIG. 12) of the recommendation information selection process, the recommendation unit 1c may transmit the recommendation information using meteorological phenomenon information relating to the location of the user as the transmission target.

For example, when the second shop to be transmitted as the recommendation information is crowded and there is a possibility of a generation of a waiting time, a selection of the second shop can be made considering, for example, whether the waiting time can be spent in an appropriate state or not.

Accordingly, specifically, the shop that requires waiting outside on a rainy day or a low temperature day can be removed from the second shop candidate, thereby ensuring providing information that highly satisfies the user. Besides, it is also possible to, for example, preferentially extract the shop that secures the movement path through which the movement can be made without being exposed to the rain or wind on a rainy day as the second shop candidate.

As described in the second embodiment, the detecting unit 1a that detects that the user has exited the shop 200 and the recommendation unit 1c that transmits the recommendation information based on the information of the shop 200 to the user detected to have exited the shop are provided.

This transmits the recommendation information after narrowing down the user as the transmission target of the recommendation information into the user detected to have exited the shop.

Accordingly, compared with the case where the transmission of the recommendation information is performed only by visiting a shop, an unnecessary transmission of the information can be suppressed, thereby ensuring achieving improved convenience and satisfaction of the user.

The suppressed transmission and reception of the unnecessary information achieves a reduced process load of the server and a reduced process load of the information terminal possessed by the user.

As described in the description of the detecting unit 1a, the detecting unit 1a may detect that the user has taken the purchase action in the shop 200.

The necessity and the selection of the recommendation information are performed corresponding to whether the user has taken the purchase action or not.

Accordingly, it is possible to increase the possibility that the beneficial information for the user is transmitted as the recommendation information.

As described in the description of the detecting unit 1a, the detecting unit 1a may detect that the user has exited the shop by the change from the state with the detection of the user being located within a predetermined area to the state without the detection.

This detects the exit from the shop using the method to detect the visit to the shop.

That is, it is no longer necessary to, for example, install a device exclusive for the detection of an exit from the shop in the shop, thereby ensuring a contribution to a cost reduction.

As described in the description of the detecting unit 1a, the detecting unit 1a may detect the exit from the shop 200 by using the short-range wireless communication.

This eliminates a need for activating, for example, the GPS function on the user terminal 2 carried by the user in order to detect the exit from the shop 200.

The short-range wireless communication usually is communicative with a comparatively low power consumption. In particular, it consumes power lower than that when the GPS function is constantly activated. Accordingly, the battery consumption of the user terminal 2 carried by the user can be reduced, thereby ensuring achieving the improved convenience of the user.

As described in the second embodiment (FIG. 9 and FIG. 10), the recommendation unit 1c may transmit the information relating to the shop 200 from which the exit from the shop is detected as the recommendation information when no purchase action is detected in the shop 200 from which the exit from the shop is detected.

The shop where the user has visited is highly possible to be a shop that matches the user's interest and concern. The recommendation information on such a shop is transmitted to the user.

For example, when the user has visited a book store only to exit the shop without taking the purchase action, it is considered that the beneficial information relating to a section where the user has not stopped by is transmitted as the recommendation information. In this case, the possibility that the information the user has already known is transmitted as the recommendation information decreases, thereby ensuring an increased possibility of providing the beneficial information.

As described in the first embodiment and the like, the recommendation unit 1c may transmit the information relating to the substitute shop as the recommendation information when the purchase action is not detected in the shop 200 from which the exit from the shop is detected. The substitute shop is a shop different from the shop from which the exit from the shop is detected.

In the shop 200 from which the purchase action is not detected despite the visit, it is highly possible that the user has failed to accomplish a purpose. The substitute shop of such a shop 200 is presented to the user.

The substitute shop being recommended based on the shop 200 where the user has visited saves a hassle to search for a shop where the user should visit next, thereby ensuring providing highly convenient information.

As described in the first embodiment, the recommendation unit 1c does not necessarily transmit the recommendation information relating to the substitute shop when the substitute shop is unavailable.

Recommending the unavailable shop 200 might be disadvantageous for the user who receives the notification.

Accordingly, not recommending such a substitute shop ensures achieving an improved convenience of the user.

As described in the first embodiment (FIG. 7), the recommendation unit 1c may transmit the shop 200 from which many purchase actions are detected as the recommendation information when the plurality of substitute shops are extracted.

The shop 200 from which many purchase actions are detected is highly possible to be an appropriate shop for many users. Such a shop 200 is recommended as the substitute shop to the user from whom the purchase action is not detected.

Accordingly, the shop that fits to the purpose of the user is recommended as the substitute shop, thereby ensuring an increased possibility that the beneficial information for the user can be provided.

As described in the first embodiment (FIG. 7), the recommendation unit 1c may transmit the recommendation information using the information of time at which the user takes an action.

That is, the substitute shop as the recommendation information is transmitted by considering the time at which the user's visit to the shop 200 is detected and the time at which the purchase action in the substitute shop by another user is detected.

For example, it is considered that the substitute shop that should be presented at a lunch time and the substitute shop that should be presented at a dinner time are different. With this configuration, the substitute shop is extracted to be transmitted as the recommendation information by considering the information of time, thereby ensuring the further increased possibility of making an appropriate recommendation.

As described in the other example (FIG. 12) of the recommendation information selection process, the recommendation unit 1c may transmit the recommendation information using the meteorological phenomenon information relating to the location of the user as the transmission target.

For example, when the substitute shop to be transmitted as the recommendation information is crowded and there is a possibility of a generation of a waiting time, a selection and a presentation of the substitute shop can be made considering, for example, whether the waiting time can be spent in an appropriate state or not.

Accordingly, specifically, the shop that requires waiting outside on a rainy day or a low temperature day can be removed from the substitute shop candidate, thereby ensuring providing information that highly satisfies the user. Besides, it is also possible to, for example, preferentially extract the shop that secures the movement path through which the movement can be made without being exposed to the rain or wind on a rainy day as the substitute shop candidate.

5. Program and Storage Medium

A program of the embodiment is a program that causes an arithmetic processing unit (for example, the CPU) of the recommendation server 1 to execute the various kinds of processes.

The program of the embodiment causes the arithmetic processing unit to execute the detecting function that detects that the user has exited the shop.

The program of the embodiment causes the arithmetic processing unit to execute a recommendation function that transmits the recommendation information based on the information of the shop to the user who is detected to have exited the shop.

That is, this program is a program to cause the arithmetic processing unit of the information processing device to execute the respective processes illustrated in FIG. 5 to FIG. 13.

Such a program ensures achieving one or a plurality of information processing devices as the above-described recommendation server 1.

Such a program can be preliminarily stored in, for example, an HDD as a storage medium incorporated in a device, such as a computer device, and a ROM in a microcomputer that includes a CPU. Alternatively, such a program can be temporarily or permanently stored (memorized) in a removable storage medium, such as a semiconductor memory, a memory card, an optical disk, a magneto-optical disk, and a magnetic disk. Such a removable storage medium can be provided as, what is called, packaged software.

Such a program can be downloaded from a download website via a network, such as a LAN and the internet, other than being installed to a personal computer or the like from a removable storage medium.

REFERENCE SIGNS LIST 1 recommendation server,
1a detecting unit,
1b accumulating unit,
1c recommendation unit,
1d similarity determination unit,
2 user terminal,
3 communication network,
4 credit card terminal, 5 electronic money terminal,
6 point card terminal,
7 credit card system,
8 electronic money system,
9 point card system,
10 beacon transmitter,
50 user DB,
51 shop DB,
52 log DB,
200, 200A, 200B, 200C shop

The invention claimed is:

1. An information processing device comprising:
   at least one memory configured to store computer program code;
   at least one processor configured to access the computer program code and operate as instructed by the computer program code, the computer program code including:
   first detecting code configured to cause the at least one processor to detect that a user has exited a shop based on received data from a terminal associated with the user;
   second detecting code configured to cause the at least one processor to detect that a user has made a purchase action or that a user has not made a purchase action based on detecting a result obtained by comparing a distance between a location of the received data and a point of sale system with a threshold distance;
   accumulating code configured to cause the at least one processor to store a history that a user has not made a purchase action based on detecting a result of the second detecting code until the user has exited the shop; and
   recommendation code configured to cause the at least one processor to transmit, via a communication network, recommendation information to the terminal associated with a first user, wherein the recommendation information is based on a history of a second user who has not made a purchase action in the shop where the first user has exited and information of the shop the first user has exited,
   wherein the location of the received data is a location of a user terminal in the shop, and the location of the user terminal is determined based on signal strengths of signals received by the user terminal from a plurality of short-range wireless communication devices, installed at the shop, such that the at least one processor detects that a user has not made a purchase action based on the signal strengths of signals received by the user terminal.

2. The information processing device according to claim 1, wherein
   the second detecting code is configured to cause the at least one processor to detect that a user has taken a purchase action in the shop.

3. The information processing device according to claim 2, wherein the recommendation code is configured to cause the at least one processor to transmit information relating to a shop from which an exit from the shop is detected as the recommendation information when a purchase action is not detected in the shop from which the exit from the shop is detected.

4. The information processing device according to claim 2, wherein the recommendation code is configured to cause the at least one processor to transmit information relating to a substitute shop as the recommendation information when a purchase action is not detected in a shop from which an exit from the shop is detected, the substitute shop being a shop different from the shop from which the exit from the shop is detected.

5. The information processing device according to claim 4, wherein the recommendation code is configured to cause the at least one processor not to transmit the recommendation information relating to the substitute shop when the substitute shop is unavailable.

6. The information processing device according to claim 4, wherein when a plurality of the substitute shops are extracted, the recommendation code is configured to cause the at least one processor to transmit information of one or more shops in descending order of a number of purchase actions are detected as the recommendation information.

7. The information processing device according to claim 4, wherein the recommendation code is configured to cause the at least one processor to transmit the recommendation information using information of time at which a user takes an action.

8. The information processing device according to claim 4, wherein the recommendation code is configured to cause the at least one processor to transmit the recommendation information using meteorological phenomenon information relating to a location of a user as a transmission target.

9. The information processing device according to claim 1, wherein the first detecting code is configured to cause the at least one processor to detect an exit from a shop by a change from a state with a detection of a user being located within a predetermined area to a state without the detection.

10. The information processing device according to claim 1, wherein the first detecting code is configured to cause the at least one processor to detect a user's exit from a shop by using a short-range wireless communication.

11. An information processing method executed by an information processing device including at least one processor, the method comprising:
    detecting that a user has exited a shop based on received data from a terminal associated with the user;
    detecting that a user has made a purchase action or that a user has not made a purchase action based on detecting a result obtained by comparing a distance between a location of the received data and a point of sale system with a threshold distance;
    storing a history that a user has not made a purchase action based on detecting a result until the user has exited the shop; and
    transmitting, via a communication network, recommendation information to the terminal associated with a first user, wherein the recommendation information is based on a history of a second user who has not made a purchase action in a shop where the first user has exited and information of the shop the first user has exited,
    wherein the location of the received data is a location of a user terminal in the shop, and the location of the user terminal is determined based on signal strengths of signals received by the user terminal from a plurality of short-range wireless communication devices, installed at the shop, such that the at least one processor detects that a user has not made a purchase action based on the signal strengths of signals received by the user terminal.

12. A non-transitory storage medium readable by a computer, the storage medium storing a program for causing the computer to execute:
- a first detecting function that detects that a user has exited a shop based on received data from a terminal associated with the user;
- a second detecting function that detects that a user has made a purchase action or that a user has not made a purchase action based on detecting a result obtained by comparing a distance between a location of the received data and a point of sale system with a threshold distance;
- a storing function that stores a history that a user has not made a purchase action based on detecting a result until the user has exited the shop; and
- a recommendation function that transmits, via a communication network, recommendation information to the terminal associated with a first user, wherein the recommendation information is based on a history of a second user who has not made a purchase action in the shop where the first user has exited and information of the shop the first user has exited,
- wherein the location of the received data is a location of a user terminal in the shop, and the location of the user terminal is determined based on signal strengths of signals received by the user terminal from a plurality of short-range wireless communication devices, installed at the shop, such that the at least one processor detects that a user has not made a purchase action based on the signal strengths of signals received by the user terminal.

* * * * *